United States Patent [19]

Hsu

[11] Patent Number: 5,117,907
[45] Date of Patent: Jun. 2, 1992

[54] RECOVERING HYDROCARBONS WITH A MIXTURE OF CARBON DIOXIDE AND TRICHLOROETHANE

[76] Inventor: Jack J. C. Hsu, P.O. Box 770070, Houston, Tex. 77215-0070

[21] Appl. No.: 632,837

[22] Filed: Dec. 24, 1990

[51] Int. Cl.⁵ ............... E21B 43/22; E21B 43/40
[52] U.S. Cl. ............... 166/266; 166/267; 166/268; 166/274
[58] Field of Search ............... 166/266, 267, 268, 273, 166/274

[56] References Cited

U.S. PATENT DOCUMENTS

| | | | |
|---|---|---|---|
| 3,288,216 | 11/1966 | Blickensderfer et al. | 166/273 X |
| 3,442,332 | 5/1969 | Keith | 166/266 |
| 3,620,304 | 11/1971 | Hearn et al. | 166/274 |
| 3,854,532 | 12/1974 | Braden, Jr. | 166/274 |
| 3,856,086 | 12/1974 | Braden, Jr. | 166/274 |
| 4,008,764 | 2/1977 | Allen | 166/266 |
| 4,299,286 | 11/1981 | Alston | 166/268 X |
| 4,454,914 | 6/1984 | Watanabe | 166/266 X |
| 4,800,957 | 1/1989 | Stevens, Jr. et al. | 166/268 |
| 4,828,029 | 5/1989 | Irani | 166/268 |

Primary Examiner—George A. Suchfield
Attorney, Agent, or Firm—Jack H. Park; Kenneth R. Priem; Harold J. Delhommer

[57] ABSTRACT

The invention is a method of recovering petroleum hydrocarbons from an underground formation penetrated by at least one injection well and at least one production well, which comprises injecting through an injection well a mixture of carbon dioxide and about 0.1% to about 20% by weight trichloroethane at a temperature and pressure above the bubble point of the mixture, and recovering hydrocarbons and other fluids at a production well.

10 Claims, 2 Drawing Sheets

RECOVERING HYDROCARBONS WITH A MIXTURE OF CARBON DIOXIDE AND TRICHLOROETHANE

BACKGROUND OF THE INVENTION

This invention relates to an enhanced oil recovery method for improving hydrocarbon recovery. More particularly, the invention is a method of improving carbon dioxide flooding by adding trichloroethane to carbon dioxide for floods.

The injection of carbon dioxide into underground reservoirs has become one of the chief methods of enhanced oil recovery practiced in the field. A wide variety of carbon dioxide injection schemes have been tried ranging from flooding under miscible to conditionally miscible to immiscible conditions. Injection schemes have also been applied in a cyclic injection and production fashion on single wells as well as in a flood front driving carbon dioxide through a reservoir from injection to production wells.

Although laboratory miscible slimtube floods have generally displaced over 90% of crude oil in slimtubes, and immiscible laboratory core floods have achieved recoveries nearly as great, recovery efficiencies in the field have been much lower. As in other methods of sweeping reservoirs such as water flooding, steam flooding and surfactant flooding, sweep efficiencies in the field are relatively low due to a lack of reservoir homogeneity and viscosity differences between the flooding medium and the underground hydrocarbons.

These problems have been decreased for aqueous floods by the addition of water soluble polymers such as polysaccharides and polyacrylamides to increase flood viscosity. Similar approaches have been tried with hydrocarbon and carbon dioxide floods with generally poor results.

The New Mexico Petroleum Recovery Research Center has performed tests with the use of high molecular weight polymers for increasing carbon dioxide viscosity. Extensive testing on a number of commercially available polymers has failed to find a solution. High molecular weight polymers do not have a sufficient solubility to alter carbon dioxide viscosity. These tests have been reported in Heller, J. P., Dandge, D. K., Card, R. G., and Donaruma, L. G., "Direct Thickeners for Mobility Control of $CO_2$ Floods," SPE Journal, Oct. 1985.

Researchers at the New Mexico Petroleum Recovery Research Center have, however, found a class of compounds which gives substantial viscosity increases to alkane solvents by forming associations with large numbers of molecules. The organo-tin fluorides, such as tributyl-tin fluoride and diamylbutyl-tin fluoride can substantially increase the viscosity of hydrocarbon solvents. Please see, U.S. Pat. No. 4,607,696 and Dunn, P. and Oldfield, D., "Tri-n-Butyl Tin Fluoride: Novel Coordination Polymer in Solution," Journal of Macromolecular Science, Vol. A4(5) (1970) pg. 1160-76.

Two publications have noted relatively large increases in carbon dioxide densities with the addition of relatively low molecular weight compounds. These publications did not mention viscosity. See Paulaitis, M. E., Penninger, J. M. L., Gray, Jr., R. D., and Davidson, P., Chemical Engineering at Supercritical Fluid Conditions, Ann Arbor Science (1983) pg. 31-80; and Snedaker, R. A., Ph.D. Thesis entitled "Phase Equilibrium In 10 Systems with Supercritical Carbon Dioxide," Princeton University (1957).

The ability to predict the viscosity of a carbon dioxide and decane mixture by two correlations between density and viscosity was compared with actual measurements in Cullick, A. S. and Mathis, M. L., Journal of Chemical Engineering Data, Vol. 29 (1984) pg. 393-6.

U.S. Pat. No. 4,800,957 discloses a method of recovering hydrocarbons by injecting a mixture of carbon dioxide and a polar alcohol or polar glycol additive having less than about 9 carbon atoms. The alcohol or glycol additive comprises about 0.1% to about 10% by weight of the injected mixture. Significant increases in viscosity were noted.

A study of 1,1,1-Trichloroethane and carbon dioxide mixtures was made to model vapor-liquid equilibria and check the accuracy of several predictive equations. This is reported in Fink, Samuel, D., and Hershey, Harry C., "Modeling the Vapor-Liquid Equilibria of 1,1,1-Trichloroethane + Carbon Dioxide and Toluene + Carbon Dioxide at 308, 323, and 353 K," Ind. Eng. Chem. Res., Vol. 29 (1990), pp. 295-306. The reference does not discuss the behavior of a trichloroethane/carbon dioxide mixture at or above carbon dioxide critical temperatures or any applicability of such a system to hydrocarbon flooding.

SUMMARY OF THE INVENTION

The invention is a method of recovering petroleum hydrocarbons from an underground formation penetrated by at least one injection well and at least one production well, which comprises injecting through an injection well a mixture of carbon dioxide and about 0.1% to about 20% by weight trichloroethane at a temperature and pressure above the bubble point of the mixture, and recovering hydrocarbons and other fluids at a production well. A temperature and pressure above the bubble point ensures that the mixture will be in one phase.

DETAILED DESCRIPTION

Figure 1:
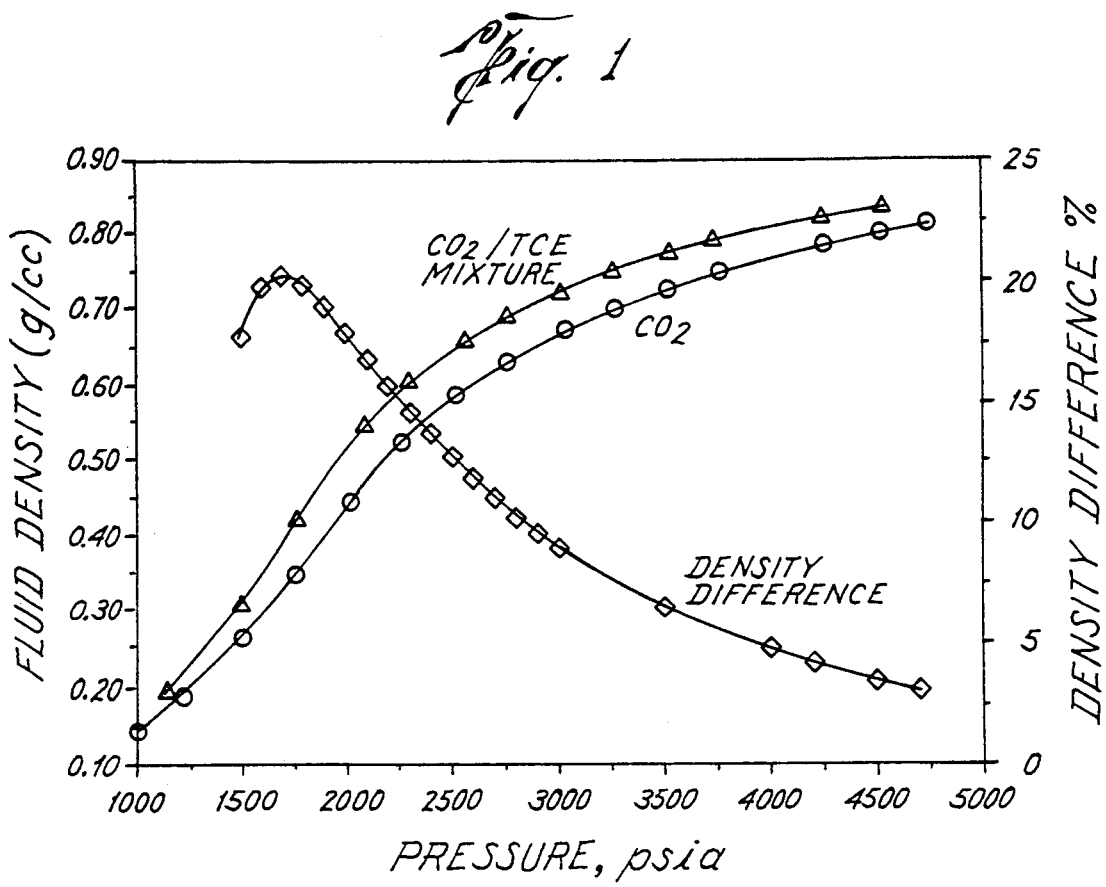
FIG. 1 is a graph plotting fluid density of 100% carbon dioxide and a 10% trichloroethane/90% carbon dioxide mixture at 160° F. versus pressure.

The invention provides a method of increasing oil recovery in carbon dioxide floods, regardless of whether the carbon dioxide flooding is conducted under miscible, conditionally miscible, or immiscible conditions. Since carbon dioxide has a relatively low viscosity and density compared to most hydrocarbons, carbon dioxide as a flooding medium tends to bypass a considerable portion of underground hydrocarbons.

In order to reduce carbon dioxide fingering through a hydrocarbon reservoir, the frontal advance of a carbon dioxide flood must be reduced to a critical velocity lower than other flooding mediums such as water or steam. But an increase in the velocity of carbon dioxide means that the critical velocity of the flood front, the limiting speed at which a front can advance without significant fingering, is higher and the flood can be conducted faster and at less cost. The mobility ratio is a portion of several different equations for finding the critical velocity of a miscible displacing medium through a hydrocarbon reservoir, one version of which can be found in U. S. Pat. No. 4,593,761. It can be represented by $$\frac{k_{rs}/\mu_s}{k_{ro}/\mu_o},$$

where $k_{rs}$ and $k_{ro}$ is the effective permeability of the reservoir rock to solvent and oil, and $\mu_s$ and $\mu_o$ is viscosity of the solvent and oil, respectively. Increasing the density and viscosity of a carbon dioxide flooding medium to bring that density and viscosity closer to the petroleum hydrocarbons being displaced from the formation will improve the recovery efficiency of the flood.

The present invention is a method of recovering petroleum hydrocarbons from an underground formation that is penetrated by one or more injection wells and one or more production wells. The invention comprises injecting through an injection well a mixture of carbon dioxide and trichloroethane at a temperature and pressure above the bubble point of the mixture, and recovering hydrocarbons and other fluids at a production well. The mixture comprises about 0.1% to about 20%, preferably about 1% to about 10% by weight of trichloroethane. 1,1,1-trichloroethane, the more polar of the two isomers of trichloroethane, is preferred.

The carbon dioxide/trichloroethane mixtures are preferably injected in a continuous fashion into the formation. However, it is also possible to inject the invention mixture in a slug of about 0.2 to about 1.0 pore volumes. In this case it is best to follow the carbon dioxide/trichloroethane slug with a driving fluid, preferably carbon dioxide or water, to push the mixture slug towards a production well.

Unless a very inexpensive supply of carbon dioxide and trichloroethane is available, it is desirable to recycle a portion of the produced fluids for further injection. This involves separating the carbon dioxide and trichloroethane from the produced fluids and reinjecting the carbon dioxide and trichloroethane at an injection well.

Although the carbon dioxide/trichloroethane mixture will recover the most hydrocarbons from a formation when injected at temperature and pressure conditions such that the solvent mixture is completely miscible with the underground hydrocarbons, the invention method is also applicable to other conditions. For instance, the method can be used in hydrocarbon reservoirs where the carbon dioxide/trichloroethane mixture is conditionally miscible or immiscible with the underground hydrocarbons.

The invention method offers several ways in which the effectiveness of carbon dioxide flooding is increased. As discussed above and in the examples, the recovery efficiency of carbon dioxide flooding is significantly increased by the addition of trichloroethane in the designated amounts to a carbon dioxide flood.

Second, the required minimum miscibility pressure for carbon dioxide flooding is significantly reduced by the addition of trichloroethane to the flood. In our laboratory tests, the minimum miscibility pressure has been reduced some 20% by the addition of trichloroethane. This significantly increases the number of candidate reservoirs for carbon dioxide flooding.

Third, the breakthrough of carbon dioxide gas is delayed at the production well by the addition of trichloroethane. Because a greater quantity of hydrocarbons is produced before production of mixed hydrocarbons and carbon dioxide solvent, the cost of product separation and purification are reduced.

Figure 4:
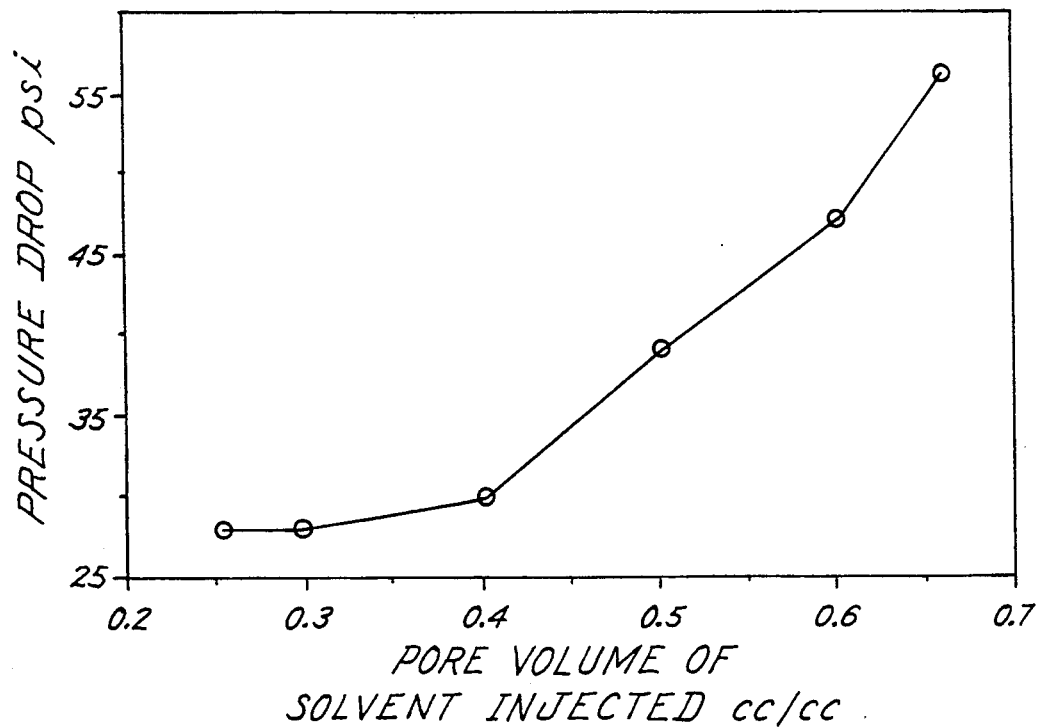
FIG. 4. is a graph illustrating pressure drop differences between floods using 100% carbon dioxide and 10% trichloroethane/carbon dioxide mixtures.

The increased effectiveness of carbon dioxide flooding by the addition of trichloroethane is due to the increased density and increased viscosity of the flooding medium. FIG. 1 illustrates the increased density of a 10% trichloroethane mixture with carbon dioxide over 100% carbon dioxide at various pressures. Although increased density does not always correlate to an increased viscosity, there is a direct correlation between density and viscosity for the invention mixture. FIG. 4 charts a difference in pressure drops between 100% carbon dioxide and 10% trichloroethane/carbon dioxide mixtures, indicating that the pressure drop between the entrance and exit of the slimtubes was greater for the invention mixtures. A greater pressure drop means a greater viscosity.

One disadvantage to flooding with trichloroethane is chlorine in the produced hydrocarbons which may hinder the refining process. It is believed that modern reforming catalysts can handle up to about 0.5 ppm of chlorine in feedstock and up to about 1% by weight of deposited chlorine. Although too much chlorine will not poison the catalyst, it will reduce selectivity.

Answers to this potential problem include reducing the amount of trichloroethane in the invention mixture, keeping separate hydrocarbons produced before and after gas breakthrough, injecting a slug of the mixture instead of continuous injection, and reducing levels of chlorine from hydrocarbons produced after gas breakthrough. Furthermore, produced oil with an unacceptable level of chlorine can be mixed with other produced oil or refinery feedstock to produce an overall feedstock with an acceptable chlorine content.

The following examples will further illustrate the invention which discloses a method for flooding with a carbon dioxide and trichloroethane mixture. These examples are given by way of illustration and not as limitations on the scope of the invention. Thus, it should be understood that procedural steps and quantities may be varied with a process still remaining within the scope of the invention.

EXAMPLES

A mixture of carbon dioxide and 1,1,1-trichloroethane was prepared with 35 ml of liquid trichloroethane and 477.94 ml of liquid carbon dioxide liquid at 75° F. and 2500 psia. The mixture (9.76 wt% (3.44 mole%) trichloroethane/90.24 wt% carbon dioxide) was used for a number of slimtube displacement tests and is the mixture reported herein as 10% trichloroethane/carbon dioxide.

The basic procedure for each slimtube flood was the same. The slimtube system was evacuated overnight at the operating temperature. The system was saturated with decane and the pore volume measured at the desired pressure. The decane was displaced as each slimtube was saturated at 160° F. with a Duhe stock tank oil having an average API gravity of about 26.5°. Pure carbon dioxide or carbon dioxide/trichloroethane mixture was injected at 25 cc/hour to displace oil at several pressures. After each slimtube test, the slimtube was cleaned by injecting decane, toluene and then decane at operating temperature. Finally, the slimtube was pressurized with decane to the next desired pressure, and Duhe stock tank oil injected.

Figure 2:
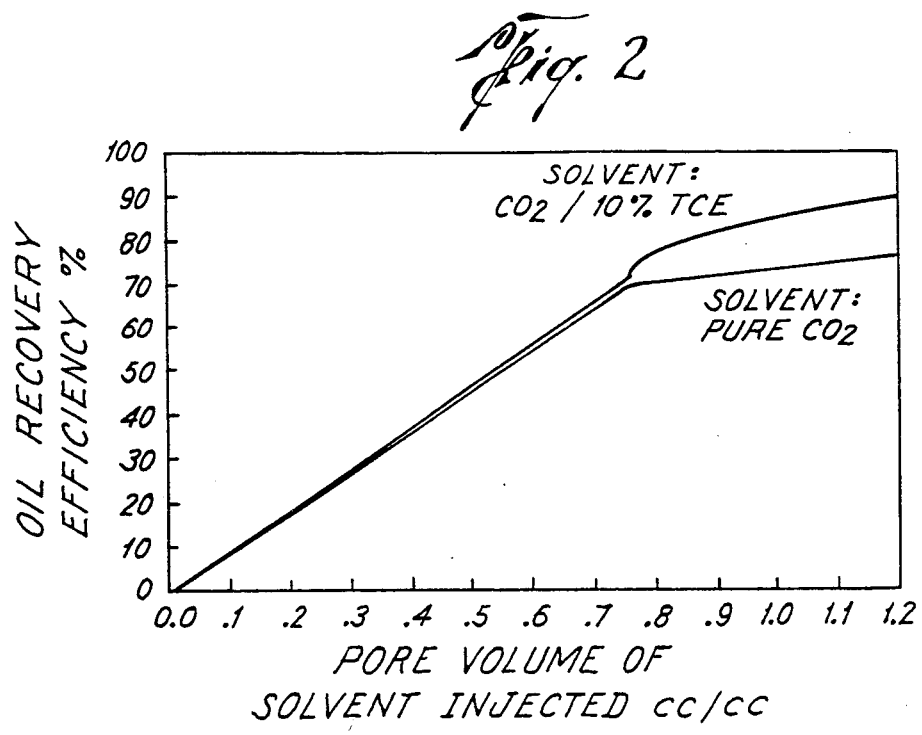
FIG. 2. is a graph illustrating slimtube displacements of oil with 100% carbon dioxide and a 10% trichloroethane/carbon dioxide mixture at 160° F. and 3500 psia.

FIG. 2 shows the recovery efficiency achieved with the slimtube flood at 3500 psia. The solvent mixture increased the ultimate oil recovery at 1.2 pore volumes about 11.6% from 77.08% to 88.65% and also delayed gas breakthrough time about 0.036 pore volumes of solvent injected.

It should be noted that the experimental oil recovery efficiency for the FIG. 2 flood was 90.04%. This figure was adjusted downward because the trichloroethane dissolved in the oil phase and increased the volume of produced liquid measured by the oil meter. Since the mixture at breakthrough had a higher relative carbon dioxide concentration and a lower trichloroethane concentration, and the relative trichloroethane concentration increased to reach a constant level, the true recovery efficiency was somewhat greater than the 88.65% reported but less than the 90.04% experimentally measured.

Figure 3:
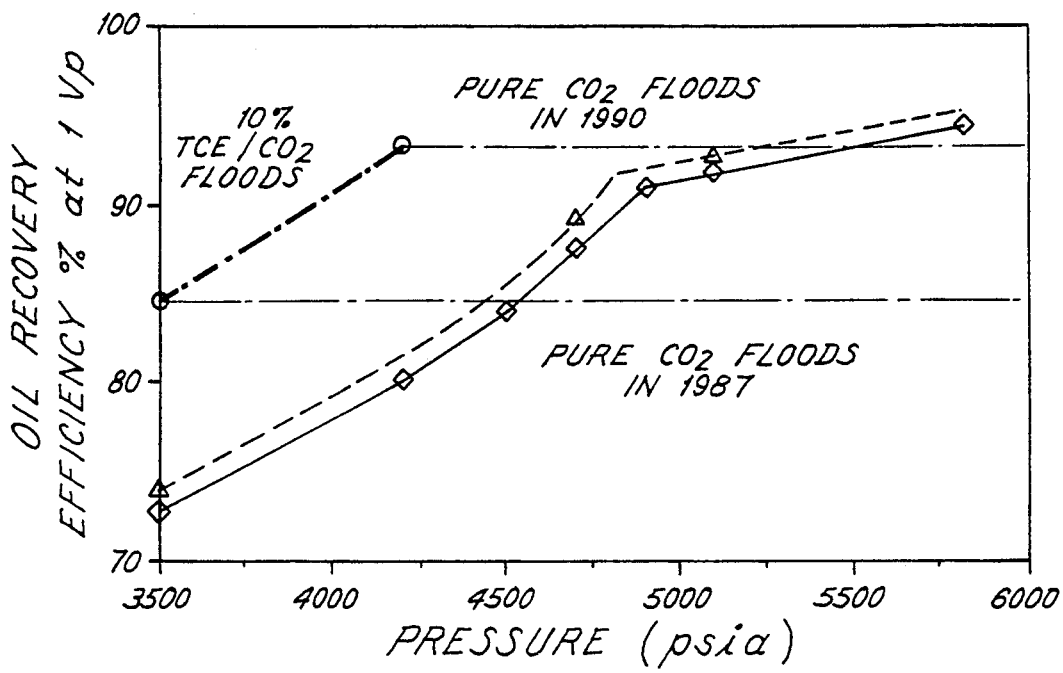
FIG. 3 is a graph plotting oil recovery efficiency versus pressure for several slimtube floods.

Additional slimtube tests were conducted at various pressures with the Duhe stock tank oil at 160° F. The results are shown in FIG. 3. The triangles with the solid line represent slimtube miscibility tests conducted with the Duhe stock tank oil and 100% carbon dioxide in 1987. The triangles with a dashed line represent similar experiments conducted recently in 1990. Reproducibility was greater than 98%.

FIG. 3 shows the effect of added trichloroethane on miscibility pressure. For example, the system pressure required to obtain 85.2% oil recovery at 1 pore volume was 4450 psia using 100% carbon dioxide and only 3500 psia using the 10% trichloroethane/carbon dioxide mixture, a 21.3% reduction. The system pressure required to obtain 93.5% oil recovery at 1 pore volume was 5200 psia using 100% carbon dioxide, but only 4200 psia using the invention mixture. Reduction in minimum miscibility pressure was about 1000 psi or 19.2% in this case.

FIG. 4 shows the pressure drop differences of slimtube displacements between floods done with 100% carbon dioxide and added trichloroethane. After 0.4 pore volumes of solvent was injected, the difference in pressure drop increased significantly between the two types of floods. Thus, the invention mixture has a higher viscosity and would reduce the mobility ratio. This should greatly benefit carbon dioxide sweep efficiency flood in a field flood.

Many other variations and modifications may be made in the method described above by those skilled in the art without departing from the concepts of the present invention. Accordingly, it should be clearly understood that the concepts disclosed in the description are illustrative and are not intended as limitations on the scope of the invention.

What is claimed is:

1. A method of recovering petroleum hydrocarbons from an underground formation penetrated by at least one injection well and at least one production well, which comprises:
   injecting through an injection well a mixture of carbon dioxide and about 0.1% to about 20% by weight trichloroethane at a temperature and pressure above the bubble point of the mixture; and
   recovering hydrocarbons and other fluids at a production well.

2. The method of claim 1, wherein the trichloroethane is 1,1,1-trichloroethane.

3. The method of claim 1, wherein the mixture comprises about 1% to about 10% trichloroethane.

4. The method of claim 1, further comprising separating the carbon dioxide and trichloroethane from the produced fluids and reinjecting the carbon dioxide and trichloroethane at an injection well.

5. The method of claim 1, wherein the mixture is injected in a slug of about 0.2 to about 1.0 pore volumes.

6. The method of claim 5, further comprising injecting carbon dioxide or water through the injection well to push the mixture slug towards a production well.

7. The method of claim 1, wherein the mixture of carbon dioxide and trichloroethane is injected at conditions of temperature and pressure such that the mixture is miscible with the underground hydrocarbons.

8. The method of claim 1, wherein the mixture of carbon dioxide and trichloroethane is injected at conditions of temperature and pressure such that the mixture is conditionally miscible with the underground hydrocarbons.

9. The method of claim 1, wherein the mixture of carbon dioxide and trichloroethane is injected at conditions of temperature and pressure such that the mixture is immiscible with the underground hydrocarbons.

10. A method of recovering petroleum hydrocarbons from an underground formation penetrated by at least one injection well and at least one production well, which comprises:
    injecting through an injection well a mixture of carbon dioxide and about 1% to about 10% by weight 1,1,1-trichloroethane at a temperature and pressure above the bubble point of the mixture; and
    recovering hydrocarbons and other fluids at a production well.

* * * * *